United States Patent [19]
Bradford et al.

[11] Patent Number: 5,167,202
[45] Date of Patent: Dec. 1, 1992

[54] WINDOW PET PORCH

[75] Inventors: Albert O. Bradford, Poughkeepsie, N.Y.; Elizabeth M. Stulb, 86 Daley Rd., Poughkeepsie, N.Y. 12603

[73] Assignee: Elizabeth M. Stulb, Poughkeepsie, N.Y.

[21] Appl. No.: 467,131

[22] Filed: Jan. 18, 1990

Related U.S. Application Data

[63] Continuation-in-part of Ser. No. 431,985, Oct. 31, 1989, abandoned.

[51] Int. Cl.⁵ ................................................ A01K 1/00
[52] U.S. Cl. .................................................. 119/15
[58] Field of Search ................. 119/1, 15, 17, 19, 28.5; 49/168; 47/40

[56] References Cited

U.S. PATENT DOCUMENTS

| | | | |
|---|---|---|---|
| 2,932,279 | 4/1960 | Giles | 119/15 |
| 3,291,100 | 12/1966 | Negaard | 119/57.8 |
| 3,738,322 | 6/1973 | Smith | 119/15 |
| 4,021,975 | 5/1972 | Calkins | 119/19 |
| 4,224,899 | 9/1981 | Cruchelow et al. | 119/15 |
| 4,291,645 | 9/1981 | Cruchelow et al. | 119/19 |
| 4,445,459 | 5/1984 | Julie | 119/1 |

Primary Examiner—John G. Weiss
Attorney, Agent, or Firm—Joseph B. Taphorn

[57] ABSTRACT

A window pet porch provides household pets with timely access to a protected outdoors environment. It includes a cage having bottom and top interconnected by open mesh on three sides and a solid clear material, having an opening, on its fourth side. It is made of such size and weight as to be readily mountable into a window frame; it has suitable brackets and clamps for securing it there and so that its side of clear material faces the window. The opening in the solid clear material of the fourth side has as a closure device a swinging door horizontally pivoted at its top.

17 Claims, 2 Drawing Sheets

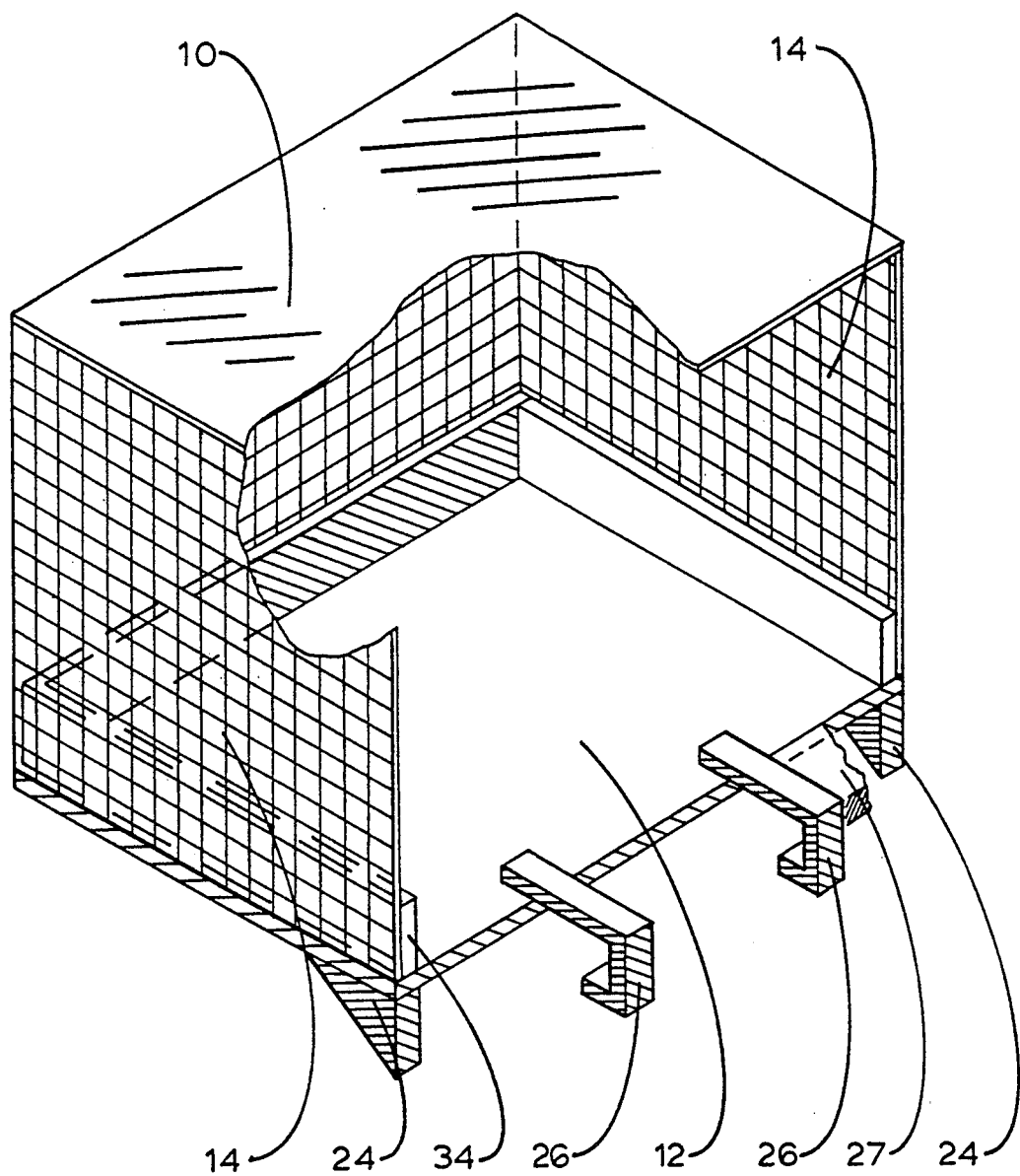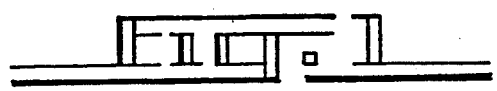

WINDOW PET PORCH

BACKGROUND OF THE INVENTION

1. Continuation-in-Part Application

This application is in part a continuation of application Ser. No. 07/431,985 filed Oct. 31, 1989 by Albert O. Bradford (and Elizabeth M. Stulb), abandoned.

2. Field of the Invention

This invention relates to pet arrangements and more particularly to arrangements for easily enabling house pets such as cats to enjoy fresh air in a protected environment.

3. Description of Prior Art

Cages for transporting or securing pets are well known. Also well known are cages for housing animals outdoors, as at zoos. These include external cages permanently affixed to animal houses and between which animals are permitted to travel. Mounting air conditioners in windows is well known.

SUMMARY OF THE INVENTION

Many people are reluctant to turn house pets loose outdoors; this not only for the pet's safety but also for due regard for environmental and health reasons. Moreover people are frequently too busy to give their pets the amount of attention they need, let alone timely attention. Yet pets profit from timely access to outdoor fresh air and sunshine.

Accordingly it is an object of this invention to provide an arrangement or device for giving household pets timely access to a protected outdoors environment.

A further object of the invention is to provide an outdoor access arrangement which can be utilized and left on pet initiative.

A still further object of the invention is to provide and outdoor access device which while accommodating in and out pet travel, effectively insulates the interior of the building (house) from the outdoors.

Another object of the invention is to provide an outdoor access device wherein the activity of the pet can be easily monitored from inside the house.

Still another object of the invention is to provide an outdoor access device that is easy to clean and maintain.

Yet another object of the invention is to provide an outdoor access device that is easy to install, and simple and inexpensive of manufacture.

The objects of the invention are realized through the invention of a window pet porch. A cage having bottom and top interconnected by open mesh material on three sides and a solid clear material, having an opening, on its fourth side, is provided. Furthermore, it is made of such size and weight as to be readily mountable into a window frame; it is provided with suitable brackets and clamps for securing it there an so that its side of clear material faces the window. The opening in the solid clear material of the fourth side is provided with a closure device such as a swinging door horizontally pivoted at its top.

A feature of the invention is that the door always swings to a closing position under the influence of gravity after pet has moved through the opening.

An advantage of the invention is that the pet porch seals the building environmentally except when the pet is entering into or egressing from the cage. Of course then the pet is effecting a partial seal.

BRIEF DESCRIPTION OF DRAWINGS

These and other objects, features and advantages of the invention will be evident from consideration of the following specification when read with the accompanying drawings wherein:

FIG. 1 is an isometric schematic showing mainly a portion of the cage of the window pet porch;

DETAILED DESCRIPTION OF AN INVENTION EMBODIMENT

Figure 2:
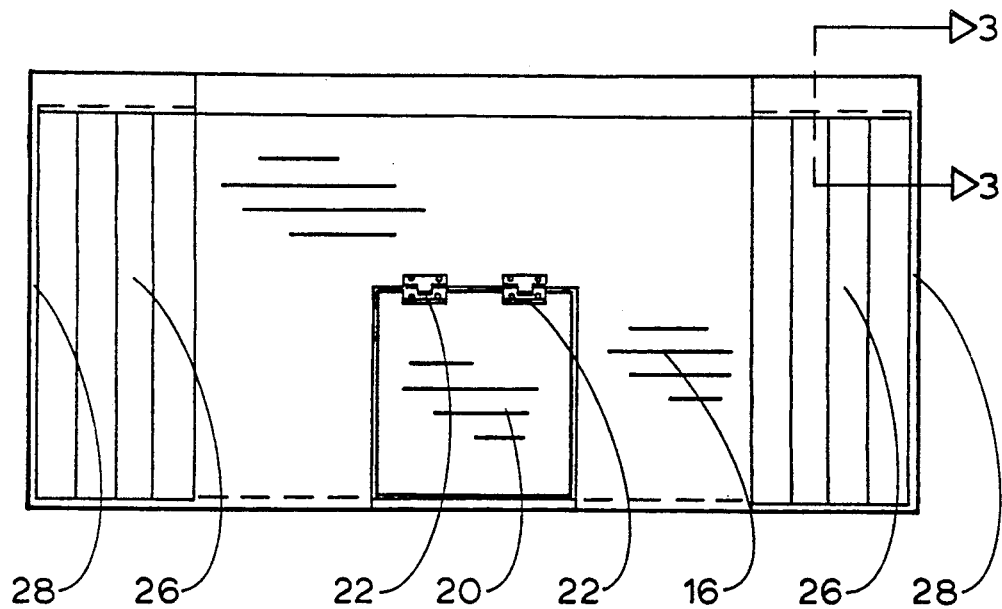
FIG. 2 is a schematic view of the front of the window pet porch (that is from the interior of a building mounting the window pet porch)

Referring now to FIG. 1 of the drawings, there is shown therein a rectangular window pet porch cage having a solid flat roof 10 which may be metal or plastic, a solid floor 12 which may be metal or plastic, and three open-mesh walls 14 which may be of plastic or metal, and a fourth side wall 16 (FIG. 2) of a transparent material such as clear plastic. The transparent wall 16 is formed with an opening 18 of sufficient size as to accommodate the passage of a particular kind of pet such as a cat.

A door 20 closes off the opening 18 to prevent the passage of undesirable warm or cold air when the pet is not in passage. To this end the door 20 is horizontally hinged (22) at its top to the transparent wall at the upper edge of the opening. The hinges 22 are such that the door is free to swing in either direction on a push from the pet and will remain open only so long as the pet is passing through the opening 18, after which it closes under the influence of gravity. The door too may be of a transparent plastic to further enable monitoring of the pet from indoors.

Brackets 24 (FIG. 1) depend from the bottom of the floor 12 to engage the building beneath the window and support the cage. The cage will be held to the window and against falling away from the building by hooks 26 extending and depending from the front end (below the transparent side) of the cage and so as to engage the inside and underside of a window sill 27 (pet perch, too) and prevent outward and downward movement of the cage about the brackets 24 (FIG. 1).

Figure 3:
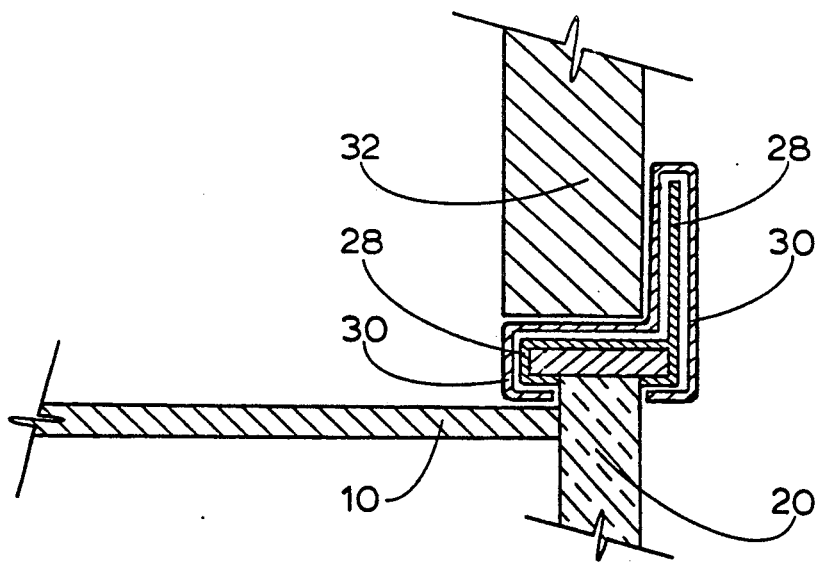
FIG. 3 is a partial view taken along the section line 3—3 of FIG. 2.

To accommodate windows of various sizes, the front sides of the cage are provided with semi-firm but pliable corrugated plastic panels 26 (FIGS. 2 and 3) in inverted "L" shaped frames 28 slideably mounted in tracks 30 on the cage. The inner edges of the panels 26 are secured to the cage front wall 16 and the outer edges to the vertical portions of the frames 28. The horizontal portions of frames 28 are flat portions slideably received within a grooved hollow track mounted across the front of the roof 10. The track 30 is L-shaped in cross-section and the horizontal portions of the frames 28 too are L-shaped in cross-section to provide extra rigidity against inward or outward swinging movement of the lower ends of the panels 26. Once the pet porch is seated in the window with the hooks 26 and brackets 24 properly engaged, the frames 28 are moved sideways to the sides of the window frame, stretching the semi-firm but pliable corrugated plastic panels 26 to close off the window spaces to the sides of the cage. In the case of double hung windows, the bottom window 32 (FIG. 3) would be lowered to close off the space above the cage and so that it rests behind the vertical portion of the "L" shaped track 30 to further secure the porch in place.

About the lower portion of the three side walls, a ring 34 (FIG. 1) of solid material is provided to give the pet protection against the wind. The ring 34 may be formed integral with the floor 12 or separately installed.

It will be apparent that applicant has invented a new and useful arrangement for enabling pets to enjoy the outside fresh air at their will and without any danger to themselves or inconvenience to their owners. The window pet porch is easily installable by the pet owners, involving simply unpacking the porch, opening a window, and setting the porch through the window and so that the brackets 24 engage the outside of the building, and the hooks 26 engage the inside of the window sill 27 which also functions as the perch for the pet to jump to before entering and from after leaving the porch. The semi-firm but pliable corrugated plastic panels 26 are then extended laterally via the slideable frames 28 to close off the window to each side of the cage. The lower window 32 of a double hung window is then lowered to behind the track 30 vertical portion to complete the window closure.

A pet such as a cat will then be shown or enticed to operate the door 20. After a few showings, the pet will pass through the opening 18 at his or her pleasure.

It is to be appreciated that the above described arrangement is simply illustrative of an application of principles of the invention, and that numerous other arrangements may be readily devised by those skilled in the art which will still embody the principles and spirit of the invention. It is intended to be limited only by the scope of the appended claims.

What is claimed is:

1. A pet porch comprising a cage having an opening on one side, means for mounting the cage at a building window frame opening having a sill and so that the sill may serve as a pet perch in front of the cage, and means for closing said opening when a pet is not passing there through, the side having the opening being a solid wall of transparent material.

2. A pet porch according to claim 1, wherein the means for closing the opening is a swinging door biased to closed position.

3. A pet porch according to claim 2, wherein the door is horizontally hinged at its upper end and gravity biases it downward to its closed position.

4. A pet porch according to claim 1, wherein another side of the cage is an open mesh.

5. A pet porch according to claim 4, wherein the cage has a solid roof.

6. A pet porch according to claim 4, wherein the cage has a solid floor.

7. A window pet porch comprising a cage having a floor and a roof and sides interconnecting said floor and roof, one of said sides being of a solid transparent material to permit indoor observation of the outdoor pet and having an opening for the passage of a pet, and means for mounting the cage at a building window frame opening having a sill and so that the sill may serve as a pet perch in front of the cage.

8. A window pet porch according to claim 7, and means for closing the opening when a pet is not passing therethrough.

9. A window pet porch according to claim 8, wherein the means for closing the opening is a swinging door biased to close position.

10. A window pet porch according to claim 9, wherein the door is horizontally hinged at its upper end and gravity biases it downward to its closed position.

11. A window pet porch according to claim 7, wherein another side of the cage is an open mesh.

12. A window pet porch according to claim 7, wherein the cage is generally rectangular in horizontal cross-section, and at least one of the other three sides is an open mesh.

13. A window pet porch according to claim 7, wherein the other sides of the cage are essentially of open mesh, but the bottom of these sides has a solid material to provide the pet protection against the wind.

14. A window pet porch according to claim 7, and means for closing off any space between the sides of the cage and the sides of the window.

15. A window pet porch according to claim 14, wherein the means for closing any space between the sides of the cage and the sides of the window are semi-firm but pliable corrugated plastic panels on slideable frames.

16. A window pet porch comprising a cage having a roof and a floor and four side walls interconnecting the roof and the floor, one side wall being of a transparent solid material having an opening and the other three sides generally being of open mesh, a door for closing said opening and horizontally pivoted at its upper end so as to be gravity biased to a lower position closing off said opening, means for mounting the cage in a building window frame and so that the opening faces the building interior and accommodates using the sill of the window frame in front of the cage as the pet perch for entering and leaving the porch, said means including straps each fixed at one end to the floor and bent down to grasp the sill at the other end, semi-firm but pliable corrugated plastic panels on slidable frames mounted on each side of the cage to close-off any space between the sides of the cage and the window frame, and solid material at the bottom of each of the open mesh side walls to provide a pet protection against the wind.

17. A window pet porch according to claim 16, and means for interacting with the lower window of a double hung window for further securing the porch in place.

* * * * *